Jan. 10, 1933.　　A. WINKLER ET AL　　1,894,077
CHOCOLATE AND THE LIKE COATING MACHINE
Filed May 7, 1930　　5 Sheets-Sheet 1
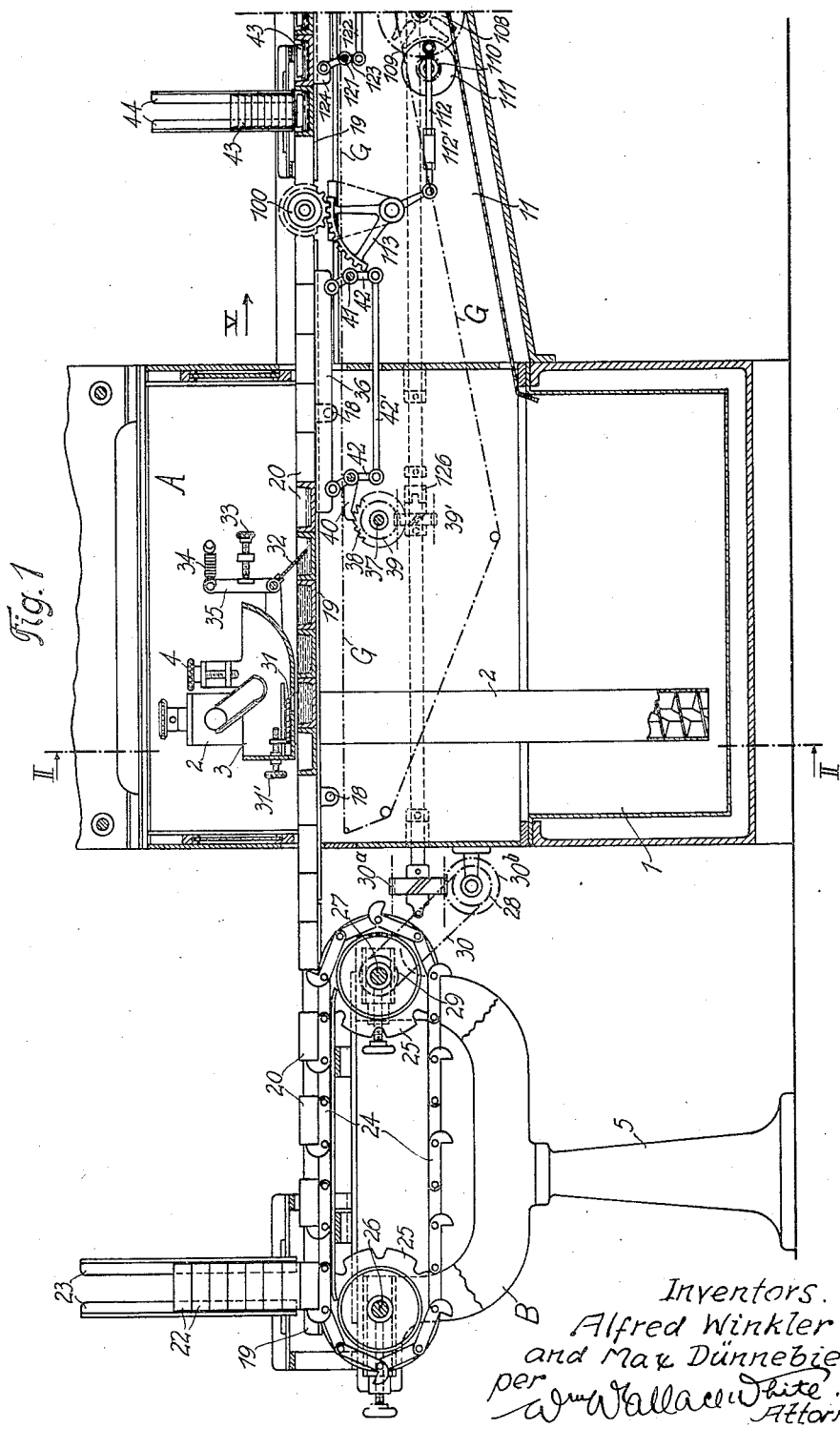
Inventors.
Alfred Winkler
and Max Dünnebier
per Wm Wallace White
Attorney

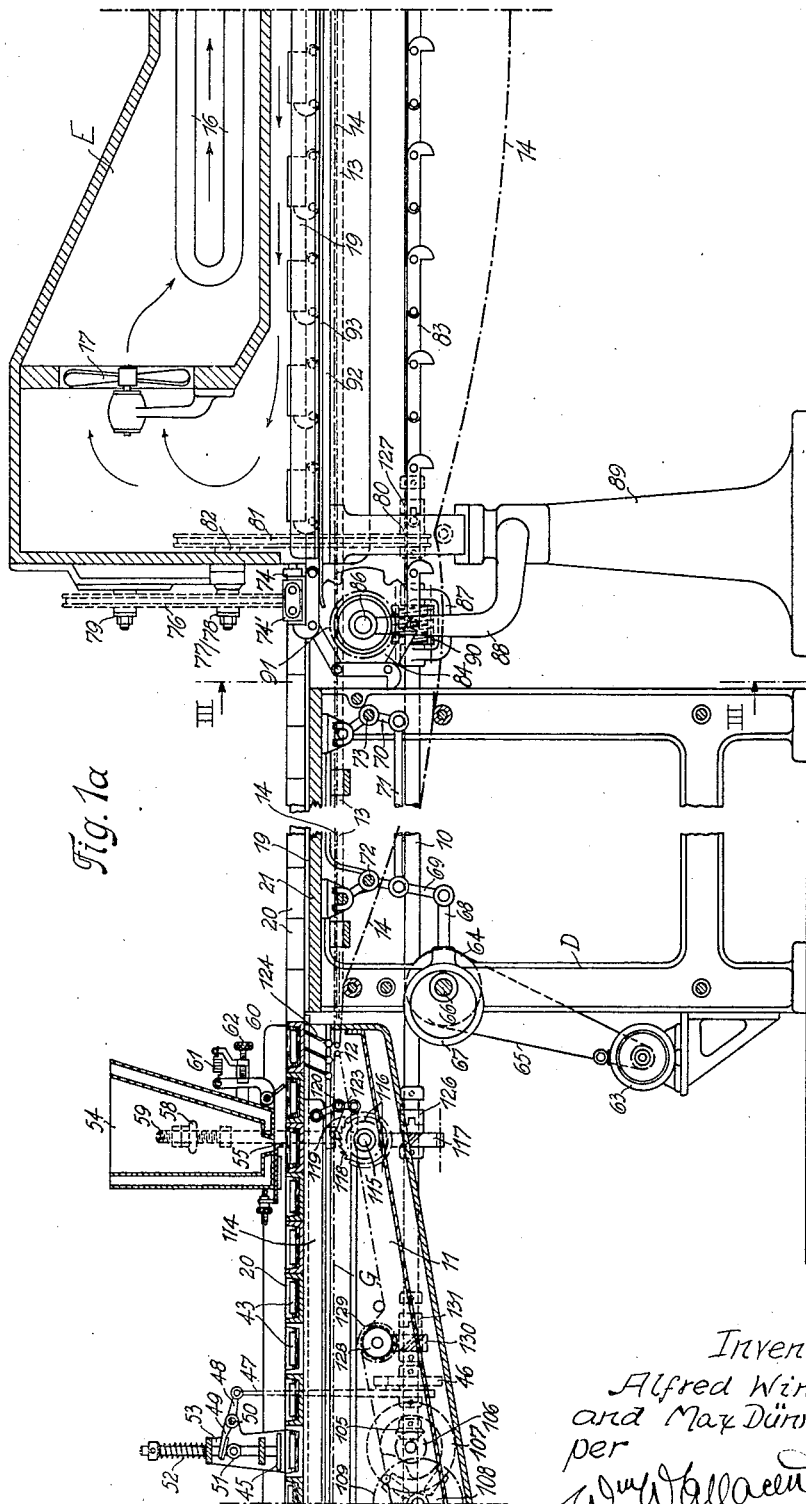

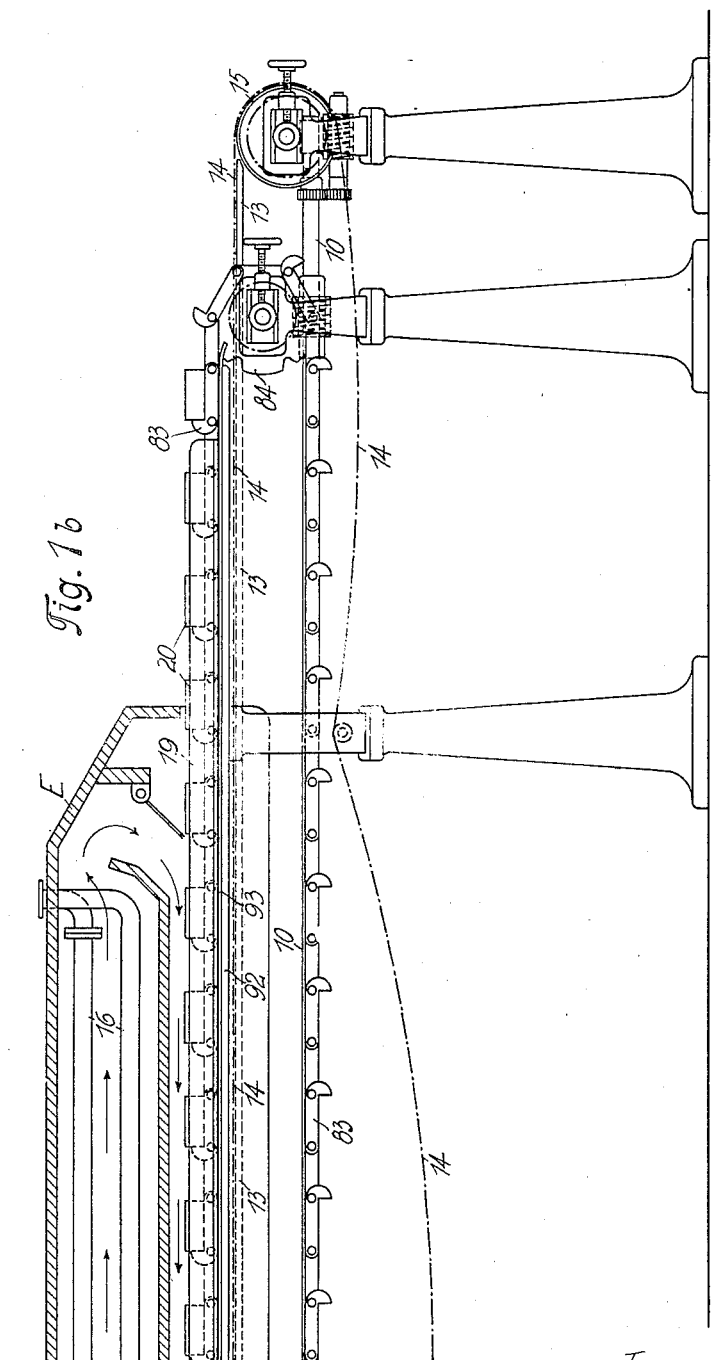

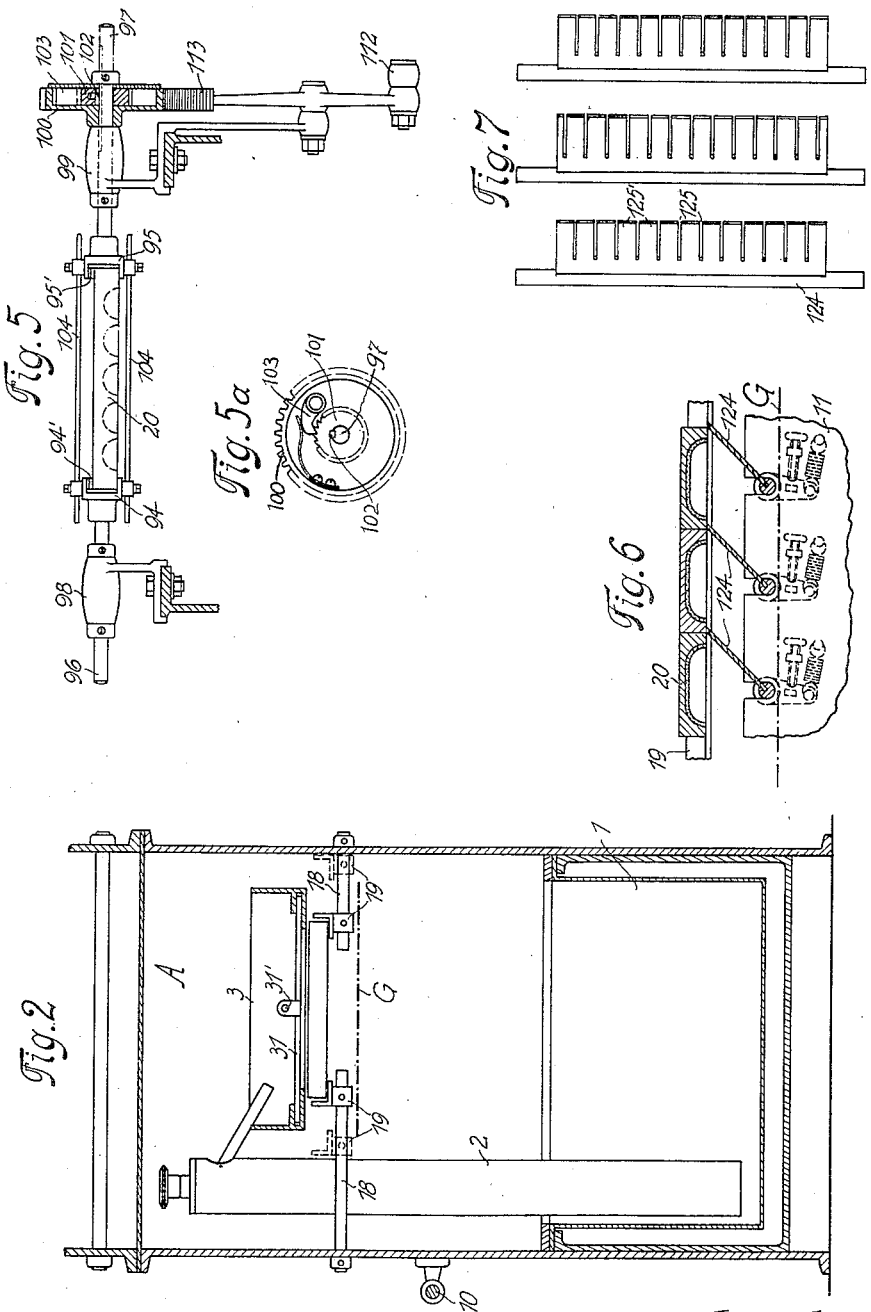

Jan. 10, 1933. A. WINKLER ET AL 1,894,077
CHOCOLATE AND THE LIKE COATING MACHINE
Filed May 7, 1930 5 Sheets-Sheet 5
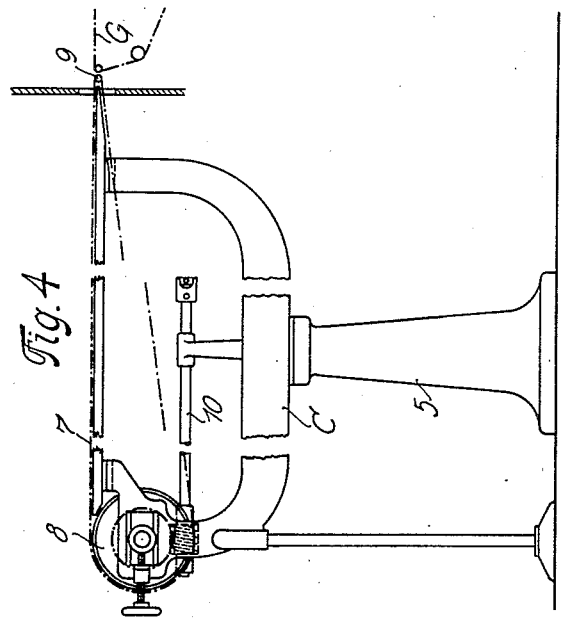
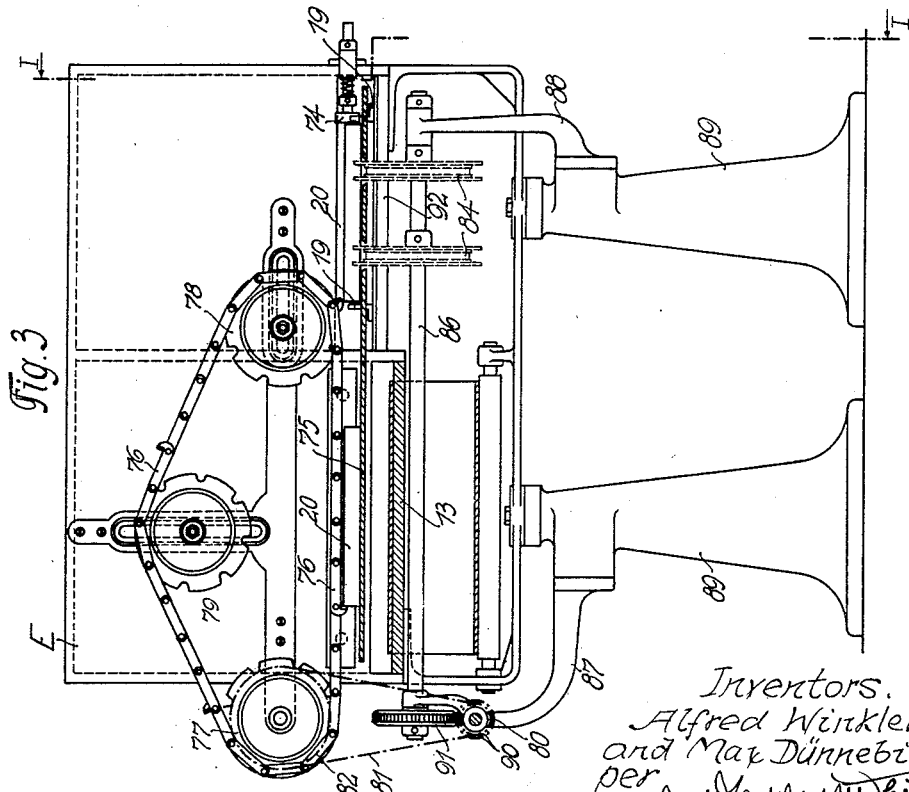
Inventors.
Alfred Winkler
and Max Dünnebier
per
Wm Wallace White.
Attorney Patented Jan. 10, 1933

1,894,077

UNITED STATES PATENT OFFICE

ALFRED WINKLER AND MAX DÜNNEBIER, OF NEUWIED, GERMANY

CHOCOLATE AND THE LIKE COATING MACHINE

Application filed May 7, 1930, Serial No. 450,437, and in Germany April 29, 1927.

This invention relates to a machine for coating sugar bodies, biscuits and other articles with chocolate and the like, and also for the manufacture of filled and unfilled chocolate cakes and/or the manufacture of open hollow bodies and shell-like objects from chocolate and like material.

Heretofore special and separate machines were required for coating sugar bodies, biscuits and the like with chocolate, for making cake chocolates with and without insert or filler, and for making open hollow bodies or shell-like objects of chocolate.

One object of this invention is the provision of a coating machine that is convertible for the performance of other classes of work. A further object is to provide a complete coating machine of well-known construction for carrying out all coating work and having a cooling device both for cooling coated work and also filled molds, and also having devices which serve some or all of the following purposes:—

1. The automatic removal of the molds from a mold stack and the feeding of the empty molds to the machine,
2. The longitudinal conveyance of the molds through the machine.
3. The filling of the molds.
4. The partial emptying of the molds when manufacturing chocolate bodies with filling or the scraping off of the molds when manufacturing shell-like or open hollow chocolate bodies,
5. The shaking of the filled or partly emptied molds,
6. The reversing of the molds to retain only a coating on the inner walls of the mold, when manufacturing shell-like or open hollow chocolate bodies,
7. The insertion of fillers in the manufacture of filled cholocate bodies,
8. The application of pressure to the fillers when manufacturing filled chocolate bodies,
9. The application of a chocolate layer over the fillers,
10. The smoothing out of the chocolate layer applied over the fillers,
11. The shaking of the molds after their reversal when manufacturing shell-like or open hollow chocolate bodies,
12. The scraping off of the chocolate mass dripping from the turned-over molds when manufacturing shell-like or hollow chocolate bodies,
13. The shaking of the filled molds when manufacturing filled chocolate bodies,
14. The cross conveyance of the molds for the purpose of bringing them to the part of the cooling device which serves for cooling the molds,
15. The elimination of the devices not required for the particular work done at any one time.

A further object is to provide means whereby, to change from one kind of work to another, only simple operations are necessary to make the requisite changes in the machine.

With these and other objects in view the invention consists in the novel construction and arrangement of parts and in the selective combination of parts hereinafter described, illustrated in the accompanying drawings, and particularly pointed out in the appended claims, it being understood that various changes in the form, combinations and minor details may be made without departing from the spirit of the invention or sacrificing any of the advantages thereof.

In the drawings, Fig. 1 is a side view partly in vertical longitudinal section of a portion at the left hand end of the machine; Figs. 1a and 1b are similar views showing, respectively, the central portion and the right hand end of the machine, the section in Figs. 1a and 1b being taken on the line I—I of Fig. 3;

Fig. 2 is a vertical cross section through the coating machine taken on the line II—II of Fig. 1;

Fig. 3 is a vertical cross section through the machine taken on the line III—III of Fig. 1a;

Fig. 4 is a side view of the delivery table for coating work;

Fig. 5 shows partly in section and on a larger scale the device for turning the molds, seen in the direction of the arrow V of Fig. 1;

Fig. 5a is a detail view of the feed mechanism of Fig. 5;

Fig. 6 shows partly in section and on a larger scale the device for scraping off the chocolate mass dripping from the turned-over molds.

Fig. 7 is a detail plan view showing only the scrapers of Fig. 6.

In all adaptations of the machine, the chocolate mass contained by the heated double-walled main container 1 is brought by a worm 2 or some other conveying device into the receptacle 3 which can be vertically regulated by a screw device 4.

For chocolate coating work the device C (Fig. 4) is fastened to the foot or support 5 instead of the frame B carrying the mold feeding device (Fig. 1) and the bodies to be coated are placed on the conveying band 7 guided over the delivery table 6 and running over the drum 8 and the thin shaft 9. The drum is driven by means of a worm and worm wheel from the coating machine A by means of a shaft 10 extending along the entire machine. The conveying band 7 delivers the bodies to the endless conveyor G mounted in the coating machine A and indicated by dotted lines, so that said bodies are led through the chocolate mass flowing from the receptacle 3. The conveyor G is carried around a thin shaft 12 at the highest place of the heated double-walled discharge chute 11 in the machine and the bodies here reach a conveying band 14 guided over a table 13. This table 13 extends through the left-hand side of the cooling device E (Fig. 3) throughout the length of this part of the machine as far as the drum 15, and it is so divided that the part which lies on the inside of the frame D can be conveniently removed. The conveying band 14 is driven by the drum 15 and the latter is driven by the longitudinal shaft 10 by means of worm and worm wheel.

In the cooling device E any desired cooling or refrigerating agent can be employed. In the example shown a cooling coil 16 is built into the cooling device and the air is caused to move by the fan 17 in the direction of the arrows along the cooling coil 16 and past the bodies or molds, so that, with coated bodies the chocolate coatings and with mold work the mold contents, are solidified during the passage through the cooling device and the work can be taken out of the cooling device ready for packing.

In the coating machine A there are arranged angle rails 19 displaceable in a crosswise direction thereof on bars 18 and located at a suitable height above the conveyor G (see Fig. 2) which rails 19 extend as far as the entrance into the cooling device E, and serve as guide tracks for the molds into which the chocolate mass is poured in connection with work of this kind.

We will now describe, in the first place, the arrangements provided in the entire machine for making cake chocolates with cream or other fillers and the method of operation of the machine in connection with work of this nature.

If it is assumed that coating work was last performed with the machine, the following changes are necessary in the first place:

The frame C with the delivery table 6 and the feed band 7 (Fig. 4) guided above it for the work to be coated, is substituted by the feed device B (Fig. 1) for the molds 20, by securing the frame B on the foot or support 5 after the removal of frame C. The angle rails 19 of the mold guide track which also extend through this frame B and which are sub-divided in the longitudinal direction, are if necessary adjusted to suit the size of the molds 20 to be handled, and finally the table plate 13 is lifted out of the frame D and replaced by the table plate 21 which is inserted in a shaking device hereinafter described. The guide rails 19 for the molds also extend over the table plate 21. The conveyor G may remain in the coating machine A if its drive is disconnected in the manner hereinafter described.

The empty molds 20 to be fed to the machine are placed on top of each other in large numbers to form a stack 22 which rests vertically or obliquely between the mold guide rails 19 in and between adjustable slides 23. A cam chain pair 24 is mounted upon two sprocket wheel pairs 25 carried by the shafts 26 and 27 which latter is driven by the sprocket wheels 28 and 29 and the chain 30. The sprocket wheel 28 is driven from the longitudinal shaft 10 by the spiral gear pair 30', 30''. The upper strands of the chains 24 are guided on rails 24', and the lowermost mold of the mold stack 22 is taken by one cam pair on the chains 24, so that the withdrawal of the molds is effected at intervals corresponding to the distances between the cams on each chain 24. The molds are thus delivered to the guide rails 19 within the coating machine A, and are intermittently pushed through the latter in close array. In this manner the molds pass under the receptacle 3, where they are filled with chocolate mass. The receptacle 3 is regulated vertically by means of the screw device 4 according to the height of the molds in use. The discharge opening at the bottom of the receptacle 3 is regulated by means of the slide 31 through the medium of the spindle 31' so as to deliver the required quantity of chocolate.

After the molds 20 under the receptacle 3 have been filled with mass, they pass beneath a scraping device which discharges a portion of the mass from each mold by means of a scraper 32 made of rubber or other elastic material so as to provide space for the filler to be introduced subsequently. This scraper 32 can be regulated by the screw device 33 which serves as a stop therefor, and the mass remaining in the mold can thus be regulated according to the adjustment of the scraper 32. A lever 35 connected to the scraper is pulled against the screw stop 33 by means of a spring 34. As the molds advance the scraper 32 is lifted by the side wall of the mold lying in the rear in the direction of movement and is pressed into the following mold by the action of the spring 34 as deeply as stop screw 33 permits.

The molds 20 now filled with mass only in part reach the shaking rails 36 which are arranged between the guide rails 19. By these rails 36 the mass contained in the molds is deaerated and is caused at the same time to conform closely to the surface of the mold. The movement of the shaking rails 36 is effected from the shaft 37 which is driven from the longitudinal shaft 10 by means of the spiral gears 39 and 39'. The shaft 37 carries the toothed shaking wheel 38 which is engaged by a shaking lever 40 connected to levers 42 carried by the shaft of said lever 40 and by a second shaft 41. The levers 42 are connected to each other by a rod 42' and are also connected to the shaking rails 36 to which shaking movement is thus imparted. The shaking rails 36 can be conveniently lifted out or disconnected from the levers 42 when changing to coating work.

Beyond the shaking rails 36 cream bars 43 or other fillers are stacked between slides 44 and the lowermost bar 43 is automatically placed in each mold when the latter passes under the stack. In order to introduce the fillers 43 into the mold with a uniform thickness of the chocolate mass surrounding it, particularly on the lower and upper sides each bar 43 receives slight pressure from above by a stamp 45 operated by a disc or cam 46 on the longitudinal shaft 10, through the medium of a draw-bar 47 which operates a crank 48 fulcrumed in common with levers 49 on a shaft 50. The levers 49 press with their free ends on rollers 51 on the stamp 45 and thereby move it downwards, against the action of springs 52 by means of which the rollers 51 are kept constantly in contact with the levers 49. The stamp 45 is guided in a bearing arm 53 carried on the machine frame. In order to adapt the lowest position of the stamp 45 to the actual needs at any time, the draw bar 47 can be varied in length or some other suitable arrangement may be provided.

After the filler has been introduced, the molds pass under a mass carrying receptacle 54 for applying the mass over the filler so that a complete chocolate cover is applied. The receptacle 54 is made with double walls receiving a heating medium to regulate the heat of the mass and has several outlets 55 in its bottom, which outlets can be opened or closed more or less by the slide 56, according to the requirements of the thickness and size of the cover. For regulating the slide 56 the screw device 57 is used. In order to insure a uniform application of the bottom covering mass, the slide 56 is bent downwardly at its front end. This prevents the outflowing mass from flowing back. The receptacle 54 is adjustable vertically by the hand wheels 58 arranged on both sides, which wheels are internally screw-threaded for engagement with threaded spindles 59, so that the receptacle can be adjusted to the proper height above the molds. The chocolate mass discharged through the outlet openings 55 of the receptacle 54 is applied in strips on the upper side of the filler and as the mold continues to advance these strips are distributed uniformly throughout the entire surface of the filler by the distributing plate 60 and the mass smoothed out. At the same time the upper mold edge is freed of adhering mass by this distributing plate 60. A spring 61 effects a permanent contact of the distributing and scraping plate 60 with the mold. A set screw 62 serves for adjusting the plate 60 to suit the height of the mold. In order to keep the lateral outer surfaces of the molds 20 clean, scrapers are or may be arranged at several points on the two insides of the mold guide rails 19, these scrapers not being shown in the drawings. The mass scraped off and dripping out is led back again to the main receptacle 1 of the coating machine A by the heated discharge chute 11.

The molds 20 now filled with finished chocolate cakes reach the shaking or beating table 21, where they are again slightly shaken in the usual or well known manner in order to deaerate the bottom coating and give the necessary polish or smoothness to its surface. The drive of the shaking or beating table is provided by the special motor 63 by means of the belt 65 driving the pulley 64 which latter is attached to the shaft 66. Cams 67 are operated by the shaft 66 and have connecting rods 68 which transmit the movement to the double-armed levers 69 and, through the connecting rod 71, also to the levers 70. These levers 69 and 70 are fulcrumed on the shafts 72 or 73 and their upwardly projecting arms are jointed to the shaking or beating table 21. The stroke of the cams 67 can be varied in any well known manner in order to regulate the intensity of the shaking. The table plate 21 with the guide rails 19 for the molds can be easily taken out of the levers 69 and 70, so that it can be lifted off when changing to coating work.

After leaving the table 21, the molds reach the cooling device E, inside of which the conveying devices for coated work and for the molds are arranged alongside of each other. The table 13 and the conveying band 14 for conveying the coated bodies run through the cooling device E (Fig. 3) in the same direction in which they come from the coating machine, while the hereinafter described conveying device for the molds is provided inside of the cooling device but laterally displaced from the straight line. This arrangement is provided in order to render it possible to change simply and quickly from coating to mold work or vice versa, because otherwise the drives of the two conveying devices would be in the way of each other and it would be necessary to take out and put in parts in a highly complicated manner in order to effect each change.

Accordingly, the molds, prior to their entering the cooling device, must be displaced in a crosswise direction. For that purpose the guide rails 19 of the said table 21 are guided only far enough for the front mold 20 (Figures 1a and 3), when it comes into contact with an elastic stop or buffer 74, to have completely left the guide rails 19. In this connection it reaches at the same time a foundation 75 extending crosswise throughout the entire width of the cooling device E. At this place a cam chain 76 running crosswise to the former conveying path of the molds and above the same is provided, being supported at the front wall of the cooling device E and guided over the two sprocket wheels 77 and 78 and over a tension roller 79. The chain 76 receives its drive from the sprocket wheel 80 on the longitudinal shaft 10 through a chain 81 which drives a sprocket wheel 82 which latter is carried on the same axle as the said sprocket wheel 77. The speed and timing of the cam chain 76 is so regulated that during the time the row of molds stands still due to the feed device B, the foremost mold in the row is pushed sidewise on to the mold conveying device which leads through the cooling device. For adaptation to the various mold sizes the sprocket wheel 78 and the tension roller 79 are variable, so that the conveying cams of the chain 76 become effective at any one time and release the molds of each size at the proper place. An elastic stop 74' is also provided for restricting the cross movement of the molds.

To convey the molds through the cooling device E two cam chains 83 are guided over two sprocket wheel pairs 84 and 85. The front sprocket wheel pair 84 is attached to a shaft 86 carried on arms 88 and 87 which are in turn carried on the legs 89 supporting the cooling device E. On the arm 87 the longitudinal shaft 10 is also supported and carried on this shaft 10 is a worm 90 in mesh with a worm gear 91 carried on the shaft 86, for driving the sprocket wheels 84 and the chains 83. The cam chains 83 are guided over a table 92 inside of the cooling device E, this table carrying a sheet or flat iron covering 93 and forming at the same time the lower closure of the mold cooling device. The mold guide rails 19 also extend through the latter; they are so connected to the table 92 that they can be regulated to suit different mold sizes.

After leaving the cooling device the molds can be taken off and emptied, their contents being ready for packing without further preparation.

In manufacturing shell-like objects or open hollow figures from chocolate for which casting molds are also used the manner of operating the machine is as follows:

After the molds 20 have been brought to the coating machine the same as with the kind of work last described and have been filled under the receptacle 3, they are merely scraped off flush with their upper edges by means of a rigid scraper inserted in place of the elastic scraper 32; they therefore remain filled and in this condition reach the shaking rails 36 on which the mass is shaken to be deaerated and adapted to the finenesses of the mold. The manner of actuating the shaking rails 36 has already been described.

From the shaking rails 36 the molds with this kind of work reach in the first place a turning device in which they are turned through 180 degrees, so that the mass contained in them flows out and only a coating adheres to the inside walls of the mold, subsequently forming the shell-like or open hollow object.

The turning device consists (see Fig. 5) of a guide rail pair 94 and 95, whose shafts 96, 97 rotate in bearings 98, 99 and are adjustable in their longitudinal direction to suit different mold sizes. Outside of the bearing 99 a gear 100 is loosely mounted on the shaft 97 and has on its inside (see Fig. 5a) a feed gear wheel 101 which by a key 102 guided in a groove of the shaft 97 is insured against turning on the latter. The gear wheel 101 is engaged by a pawl 103 movably mounted in the gear 100. In this manner a rotation of the gear 100 is transmitted only in one direction to the feed gear wheel 101, to the shaft 97 and the guide rail 95, while rotation of the gear 100 in the opposite direction causes the pawl 103 to over-ride without turning the feed gear wheel 101. In order to transmit the rotation of the guide rail 95 also to the guide rail 94 of the other side, these rails are rigidly connected with each other by cross pieces 104. For operating the turning device a bevel gear 105 on the shaft 10 drives a second bevel gear 106 which is connected with the roller wheel 107 of a Maltese gear. The roller wheel 107 operates the four-part Maltese cross 108 in such a way that one quarter turn of the Maltese cross corresponds to one revolution of the roller wheel. A large gear 109 connected to said cross 108 is in mesh with a small gear 110 whose shaft carries a crank disc 111. A crank rod 112 connected with the disc 111 engages a tooth segment 113 which is rotatively carried on the bearing 99 and which is in mesh with the said gear 100 of the turning device. The arrangement is such that the angular movement imparted to the tooth segment 113 by the crank disc 111 results in a forward and backward rotation of the gear 100 through 180 degrees, while the ratio conditions within the entire driving device are so chosen that the turning of the mold takes place during the standstill of the row of molds. In order to prevent a dropping out of the mold from the turning device during the turning operation, the leaf springs 94' and 95' (Fig. 5) are provided in the grooves of the guide rails 94, 95 and serve to hold the mold fast.

The thickness of the wall of the mass adhering to the surface of the molds depends upon the time allowed to elapse between the filling and the turning of the molds, and in order to vary this wall thickness, the bearings 98 and 99 of the turning device on the side cheeks of the discharge chute 11 are so arranged that they may be readily displaced in the direction of movement of the molds. In this manner the wall thickness of the shell-like or open hollow objects can be determined as needed. In order to adapt the crank rod 112 to the various positions of the turning device, it is interchangeable and is moreover provided with an arrangement 112' for adjusting the exact length necessary for the proper operation.

After the molds which are now inverted with the open side downward have left the turning device, they reach a second shaking rail pair 114 arranged between the guide rails 19 in order to complete the discharge of the excess mass from the molds. The shaking movement of the rails 114 takes place from the shaft 115 which is driven by the longitudinal shaft 10 by means of spiral gears 116 and 117. The shaft 115 carries a toothed shaking wheel 118 with which the shaking lever 119 is in mesh. On the shaft 120 of the said lever 119 and on a second shaft 121 the levers 123 jointed to the shaking rails 114 and among each other by the draw bar 122 are attached and transmit in this manner the shaking movement to the shaking rails 114 and thus to the molds 20. The mass dripping from the inverted molds is led back to the main mass receptacle 1 of the coating machine A by the discharge chute 11.

Several elastic scrapers 124 arranged underneath the shaking rails 114 remove the drops forming at the mold edges. These consist of steel sheets shaped after the fashion of combs, which are so arranged behind each other that the spaces 125 (Figs. 6 and 7) of the one are covered by the prongs 125' of the other which lies in front and behind it. This embodiment of the scrapers ensures a neat scraping and cleaning without damaging the objects on their upper edge, as may be the case when scrapers made of solid strips of sheet metal are used.

After the scraping the molds travel over the shaking or beating table 21 but without the latter being set in motion. The further operation is the same as in the described manufacture of the cake chocolates. At the end of the table 21 the molds 20, after they have reached the stop 74, are moved by the cam chain 76 crosswise to their running track on the conveying chain pair 83 which conveys them through the cooling device E in which they are cooled off so that the molds may then be emptied.

It will be seen that the machine can also be used for the manufacture of cake chocolate without filler. In this connection the molds, after they have been filled under the receptacle 3 are scraped off by the scraper 32 and are then immediately led to the beating table 21 and through the cooling device E. All devices lying on this route for shaking, turning, introducing and pressing in the fillers and covering the bottom as well as the lower scrapers are put out of commission in this connection.

The elimination or disconnection of those devices built into the machine which are not required for the work to be done at any one time, is effected in any suitable or well known manner. The shaking rails 36 and 114 are put at rest in the example shown by pulling out a coupling part 126 fixed to rotate with the longitudinal shaft 10, from the spiral gears 39 or 117 loosely running on the longitudinal shaft 10. The turning device 94 to 13 can be eliminated by loosening the crank rod 112 from the crank disc 111 or by providing a coupling of the kind previously described in connection with the driving bevel gear 105 on the longitudinal shaft 10. The stopping of the pressing-in device for the fillers is effected by loosening the pressure levers 49 on the shaft 50. The elimination of the cam chain 76 for the crosswise conveyance of the molds also takes place by means of a coupling 127 which is provided on the driving sprocket wheel 80 on the longitudinal shaft 10. The conveyor G is driven in the example drawn by the roller 128 and the latter by means of two spiral gears 129 and 130 by the longitudinal shaft 10. Here, too, by loosening a coupling 131 in mesh with the spiral gear 130, the conveyor is set at rest. The lower elastic scrapers 124 are lifted upward with their shafts 124' from the side cheeks of the discharge chute 11 when coating work is done (Figure 6).

The power transmitting means for the various devices and the means for coupling and uncoupling such devices may be modified to suit requirements and many changes in form and construction may be made as circumstances require or experience suggests without departing from the spirit of the invention within the scope of the appended claims.

What we claim is:

1. In a coating machine, means for supplying fluent material, a support beneath said supplying means along which molds can be moved beneath the supplying means to receive material therefrom, a second supporting means slightly below said first supporting means upon which bodies may be moved to receive fluent material from said supplying means, said first supporting means being removable from above said second supporting means to permit flow of material from said supplying means to objects on said lower supporting means.

2. In a coating machine, means for supplying fluent material, a support beneath said supplying means along which molds can be moved beneath the supplying means to receive material therefrom, a second supporting means slightly below said first supporting means upon which bodies may be moved to receive fluent material from said supplying means, said first supporting means being of such a nature as to permit material from said supplying means to pass therethrough and to reach objects on said second supporting means when no molds are present on said first supporting means.

3. In a coating device as claimed in claim 1, said second supporting means comprising a movable conveyor.

4. In a coating device as claimed in claim 2, said second supporting means comprising a movable conveyor.

5. In a coating device as claimed in claim 1, said first supporting means comprising spaced parallel rails having a space therebetween through which material may flow from said supplying means to objects on said lower supporting means.

6. In a device as claimed in claim 2, feeding means arranged to feed articles to one of said supporting means at the height thereof, said feeding means being removable to permit replacement thereof by a second feeding means arranged to feed articles to the second of said supporting means at the height thereof.

7. In a coating device, means for supplying fluent material, a pair of supporting means arranged beneath said supplying means at different heights, the upper of said supporting means being slidable laterally from above the lower of said supporting means to permit flow of material from said supplying means to said lower supporting means.

8. In a coating machine, a cooling device comprising a cooling chamber, means for conveying objects through said cooling chamber, a second means for conveying other objects in the same direction through said cooling chamber and parallel to said first conveying means, means to feed objects to said cooling means along the line of said first conveying means, and a conveyor traveling in a direction approximately perpendicular to the direction of travel of the other conveying means to transfer objects horizontally from the line of said first conveying means to the line of said second conveying means.

9. In a coating machine, means for supplying fluent material, a pair of supporting means arranged beneath said supplying means at different heights, the lower of said supporting means being so arranged that objects carried thereon receive material from said supplying means when the upper supporting means is not in use, means for supplying fillers to the upper of said supporting means, and means for stopping the operation of said filler supplying means when articles are being transported on the lower of said supporting means.

10. In a coating machine, means for supplying fluent material, a mold supporting means arranged below said supplying means, a body conveying means arranged below said mold supporting means, said body conveying means receiving material flowing from said supplying means when said mold supporting means is not in use, a plurality of filler and cover supplying units adapted to operate upon molds carried by said mold supporting means, said units being stopped when bodies are carried by said body conveying means.

11. In a coating machine, supporting means for molds and a conveying device for articles to be coated arranged beneath said supporting means, means to supply fluent material to said molds, said conveying device receiving material from said supplying means when said mold supporting means is not in use, means in said supporting means to invert said molds, and means to disconnect said inverting means when articles are carried on said conveying means.

12. In a coating machine, means for supplying fluent material, means for supporting molds during passage beneath said supplying means, means for inverting said molds after they have passed beneath said supplying means, scrapers arranged beneath said supporting means at a point beyond said inverting means to scrape said molds, a conveyor for articles to be coated arranged beneath said supporting means, said conveying device receiving material from said supplying means when said mold supporting means is not in use, said scrapers being removable to permit the passage of articles on said conveying means.

13. In a coating machine, a conveyor for articles to be coated, a shaking table arranged above said conveyor and adapted to support molds, said shaking table being removable to permit the passage of articles to be coated on said conveyor.

14. In a coating machine, a cooling device including a conveyor, a table above said conveyor, a second conveyor parallel to said first conveyor, and means to transfer articles from a point on said table above said first conveyor to said second conveyor.

15. In a coating machine, a cooling device including a conveyor for articles to be coated, a table for receiving molds extending above said conveyor, means for supporting molds being fed to said table, said supporting means being removable, means below said supporting means for feeding articles to said conveyor, a second conveyor parallel to said first conveyor, and means for transferring molds on said table to said second conveyor.

16. In a coating machine, means for supplying fluent material, a pair of supporting means arranged beneath said supplying means at different heights, means for feeding articles to the upper of said supporting means, said feeding means being removable to permit replacement by means to supply articles to the lower of said supporting means, the upper of said supporting means being such as to permit fluent material to pass therethrough when no objects are supported thereon so as to coat objects on the lower supporting means, means in the upper supporting means for inverting articles, means to stop the operation of said inverting means, scrapers below said upper supporting means adapted to scrape the inverted articles, said scrapers being removable to permit movement of objects on said lower supporting means, a shaking table arranged to receive articles from said upper supporting means, a conveyor arranged to receive articles from the lower of said supporting means, said shaking table being removable to permit movement of articles on said conveyor, and a cooling arrangement including a conveyor arranged to receive articles from said first conveyor, a table extending above said conveyor and arranged to receive articles from said shaking table, a second conveyor parallel to said first conveyor, and means to transfer articles from said second table to said second conveyor.

In testimony whereof we have signed our names to this specification.

ALFRED WINKLER.
MAX DÜNNEBIER.